United States Patent [19]
Ito

[11] Patent Number: 5,337,294
[45] Date of Patent: Aug. 9, 1994

[54] CONTROL SYSTEM FOR CONTROLLING PLURALITY OF OPERATIONS OF COMMON CATEGORY BY PLURALITY OF CONTROL UNITS

[75] Inventor: Takashi Ito, Tachikawa, Japan

[73] Assignee: TEAC Corporation, Japan

[21] Appl. No.: 980,903

[22] Filed: Nov. 24, 1992

[30] Foreign Application Priority Data

Dec. 2, 1991 [JP] Japan .................................. 3-318153

[51] Int. Cl.$^5$ .............................................. H02J 9/00
[52] U.S. Cl. ...................................... 369/24; 455/352; 340/825.15; 340/825.24
[58] Field of Search ...................... 369/24; 340/825.06, 340/825.15, 825.72, 825.22, 825.24; 455/352

[56] References Cited

U.S. PATENT DOCUMENTS

| | | | |
|---|---|---|---|
| 4,771,283 | 9/1988 | Imoto | 455/352 |
| 4,864,550 | 9/1989 | Kawanaka | 369/24 |
| 5,109,420 | 4/1992 | Nonaka | 455/352 |
| 5,182,551 | 1/1993 | Goto | 340/825.72 |

FOREIGN PATENT DOCUMENTS

114347 7/1983 Japan .

Primary Examiner—Robert J. Pascal
Assistant Examiner—Tan Dinh
Attorney, Agent, or Firm—Andrus, Sceales, Starke & Sawall

[57] ABSTRACT

Each control unit of a plurality of control units comprises an operation device for operating thereof, the operation device providing an operation signal correspondingly, and a control device for providing a control signal in response to the provision of the operation signal, the control signal causing an execution device to execute a predetermined operation. The control signals provided by the each control unit are different from each other, and the predetermined operations belong to a common operation category and are different from each other. A determination device determines which of the predetermined operations the executed device should execute, without regard to which of the plurality of control units is operated.

11 Claims, 9 Drawing Sheets

FIG. 3 (10 FIRST CONTROL UNIT)

CONTROL SYSTEM FOR CONTROLLING PLURALITY OF OPERATIONS OF COMMON CATEGORY BY PLURALITY OF CONTROL UNITS

BACKGROUND OF THE INVENTION

The present invention relates to a control system for controlling a plurality of predetermined operations belonging to a common operation category by means of a plurality of control units.

A CD (compact disc or optical disc) player 50 and a remote controller 60 thereof, as being one example of the above mentioned control system in the prior art, are described below with reference to FIG. 1.

In the remote controller 60, an operator operates an operation device 61 (for example, pushes a key of the operation device 61), the operation device 61 then providing an operation signal to a control device 62 correspondingly. The control device 62 then provides a control signal to an execution device 53 in the CD player 50 correspondingly to the operation signal. The execution device 53 then executes a first predetermined CD-playing operation in accordance with the control signal. In the CD player 50, an operator operates an operation device 51 (for example, pushes a key of the operation device 51), the operation device 51 then providing an operation signal to a control device 51 correspondingly. A control device 52 then provides a control signal to the above mentioned execution device 53 correspondingly to the operation signal. The execution device 53 then executes a second predetermined CD-playing operation in accordance with the control signal.

Both the operation devices 51 and 61 respectively have keys (buttons). Both control devices 52 and 62 respectively comprise microcomputers. The above-mentioned keys in the operation device 61 in the remote controller 80 are used for the above mentioned first CD-playing operation. On the other hand, the keys in the operation device 51 in the CD player are used for the above-mentioned second CD-playing operation. These first and second CD-playing operations respectively executed by the execution device 53 respectively belong to a common "CD-playing" operation category. Further, the operations may be different from each other intentionally.

One example of such operations belonging to a common CD-playing operation category and being different from one another is described below. The control device 62 in the remote controller 60 alone has a programmable playback function by which tracks are played in a desirable order in accordance with a programmed sequence, the order being different from that by which the tunes were previously recorded on the CD. On the other hand, the control device 52 in the CD player 50 does not have this programmable playback function. In this example, the above-mentioned keys on the operation devices 51 and 61 are respectively used for the playing the tracks recorded on the CD.

In the above example, when the "play" key on the operation device 61 of the remote controller 60 is operated by the operator, the above-mentioned programmed playback is carried out by the execution device 53 in accordance with the control signal provided by the control device 62 of the remote controller 60 having the above mentioned programmable playback function. On the other hand, when the operation device 51 of the CD player is operated by the operator, the tunes recorded on the CD are reproduced in the order by which they were recorded originally.

There may occur a mis-operation such that the operator operates the operation device 51 of the CD player 50 instead of operating the operation device 61 of the remote controller 60. That is, the operator expects the above-mentioned programmed playback operation, however the tunes are reproduced in the order in which they were originally recorded. Such an undesirable condition may be troublesome when this undesirable condition occurs in, for example, a broadcasting station. In fact, for the purpose of arrangement of programs in the broadcasting station, a CD player having various, complicated functions is currently being developed. Thus, the above-mentioned undesirable condition may causes various, complicated troublesome results.

SUMMARY OF THE INVENTION

An object of the present invention is to provide a control system for controlling a plurality of predetermined operations, belonging to a common operation category, by means of a plurality of control units, which control system prevents the plurality of control units from executing an undesirable action even if a mis-operation occurs.

To achieve the above-mentioned object of the present invention, a control system according to the present invention comprises a plurality of control units; wherein each control unit of the plurality of control units comprises:

operation means for the operating thereof, the operation means providing an operation signal correspondingly; and control means for providing a control signal correspondingly to the operation signal, the control signal causing execution means to execute a predetermined operation; and wherein the control signal provided by the control unit being different from that provided by other units in the plurality of control units, and each predetermined operation belonging to a common operation category and being different from other predetermined operations in the common category; and further comprising determination means for determining which of the predetermined operations the executed means should execute, without regard to which of the plurality of control units is operated.

By this configuration, an undesirable operation condition can be prevented. This undesirable operation condition is such that the operator intends to cause the execution means to execute a first predetermined operation of the predetermined operations, but the operator mis-operates such that the operator operates the second operation means. Thus the second operation means provide the second operation signal to the second control means, and the second control means causes the execution means to undesirably execute the second operation. The reason why this undesirable second operation execution is prevented is that the determination means determines that the first operation was intended. Thus a measure to prevent the undesirable second operation being executed may be taken. Here, the first operation means and the first control means respectively belong to the first control unit of the plurality of control units. Similarly, the second operation means and the second control means respectively belong to the second control unit of the plurality of control units.

Other objects and further features of the present invention will become more apparent from the following detailed description when read in conjunction with the accompanying drawings.

DESCRIPTION OF THE PREFERRED EMBODIMENTS

Figure 1:
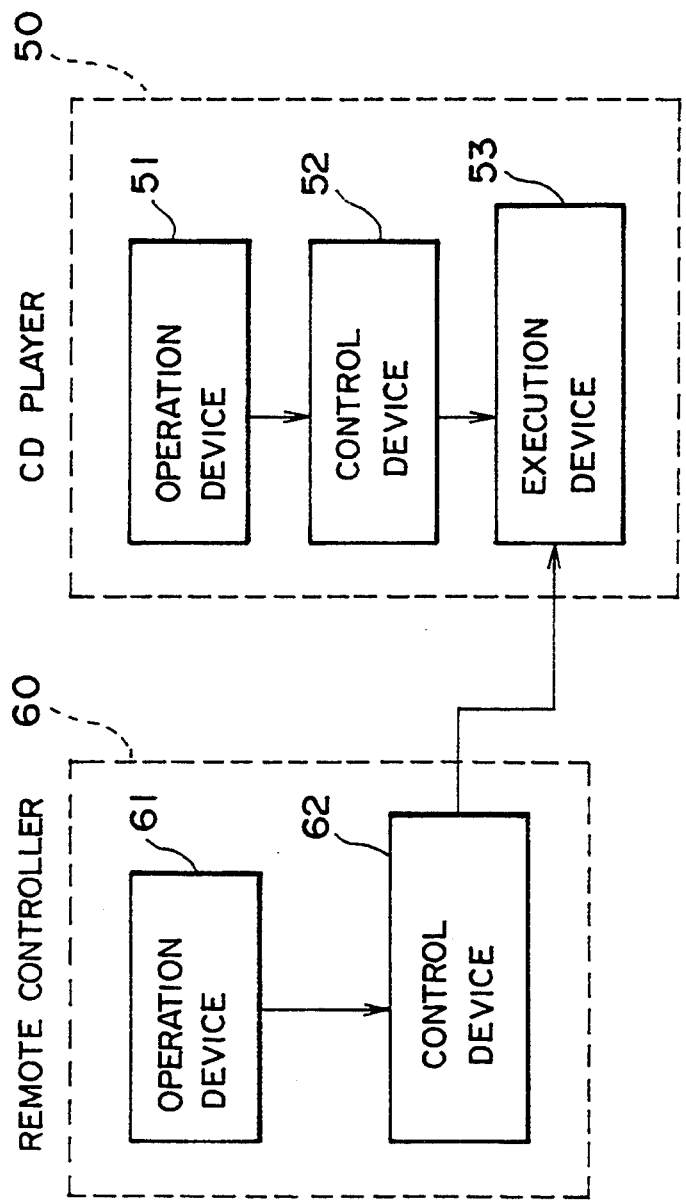
FIG. 1 shows one example of a remote controller and a CD player in the prior art.
Figure 2:
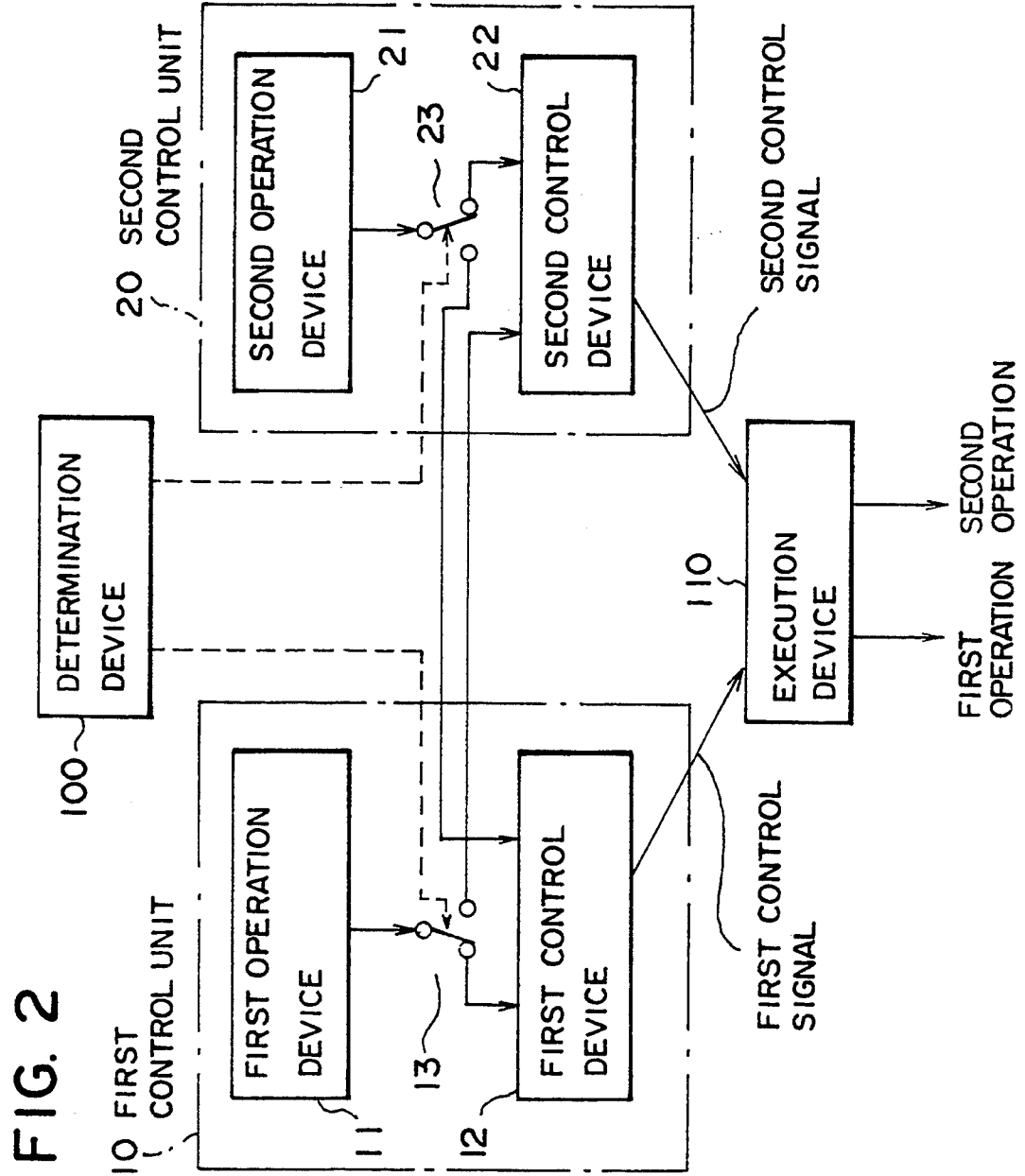
FIG. 2 shows a block diagram of a first embodiment of the control system according to the present invention.

The first embodiment of the control system according to the present invention is described below with reference to FIG. 2. This control system comprises first and second control units 10 and 20. The control system further comprises a determination device 100 and an execution device 110.

The two control units 10 and 20 may be located apart from each other. As an example of their location, the first control unit 10 is located remotely from the execution device 110 so that the execution device 110 is controlled remotely. Thus, in a case where the execution device 110 executes CD playback, for example, acoustic noise, caused by the operator operating the control unit and/or other actions of the operator, can be prevented from contaminating sound reproduced from the CD. On the other hand, in this case, the second control unit 20 is located near to the execution device 110 for the purpose of, for example, testing and/or maintenance of the execution device 110.

The first control unit 10 comprises a first operation device 11, a first control device 12 and a first switching device 13.

An operator can operate the first operation device 11 of the first control unit 10 and the second operation device 21 of the second control unit 20 (for example, can push keys of the operation devices 11 and 21).

The first switching device 13 is normally in a condition in which the first control device 12 is connected with the first operation device 11, further the second control device 22 is disconnected from the first operation device 11. Similarly, The second switching device 23 is normally in a condition in which the second control device 22 is connected with the second operation device 21, further the first control device 12 is disconnected from the second operation device 21.

When the operator operates the first operation device 11, then the first operation device 11 provide a first operation signal to the first control device 12 via the first switching device 13, correspondingly. The first control device 12 then provide a first control signal to the execution device 110 correspondingly to the first control signal provided. The execution device 110 then executes a first predetermined operation in accordance with the first control signal provided.

Similarly, when the operator operates the second operation device 21, then the second operation device 21 provides a second operation signal to the second control device 22 via the second switching device 23 correspondingly. The second control device 22 then provides a second control signal to the execution device 110 correspondingly to the second control signal provided. The execution device 110 then executes a second predetermined operation in accordance with the second control signal provided.

The above-mentioned first and second operations respectively belong to a common operation category, the first and second operations being different from each other. For example, in the above-mentioned case where the execution device 110 executes CD playback, the operator normally operates the first operation device 11 of the first control unit 10 (located remotely from the execution device 110 as mentioned above and thus acting as a remote controller). Further, in this case, the first control device 11 of the first control unit 10 may have the programmable playback function, and the second control device 21 of the second control unit 20 (located near to the execution device 110 for the above-mentioned testing and maintenance purpose) may not have it (it may not be necessary for the testing and/or maintenance).

In this case, there may be a situation in which the operator rarely operates the second control unit 20, thus the operator may misunderstand and believe the operation of the second control unit 20 to be similar to the operation of the control unit 10 in respect of the programmed playback function. In this situation, this misoperation causes the above-mentioned troublesome result in the remote controller 60 and the CD player 50 in the prior art. On the other hand, the first embodiment shown in FIG. 2 of the control system according to the present invention can prevent occurrence of the troublesome result.

This is because the determination device 100 determines that the first predetermined operation should be executed in accordance with the intention of the operator. This determination may be done based on the state of a directive switch (previously operated by the operator in accordance with the operator's intention) or other appropriate means.

By this determination result, the determination device operates the second switching device 23 so that the second control device 22 is disconnected from the second operation device 21 and the first control device 12 is connected to the second operation device 21. Thus, the second operation signal provided from the second operation device 21 is provided only to the first control device 12. Thus, the second control device 22 does not provide the second control signal, and the first control device 12 provides the first control signal to the execution device 110. Thus, the execution device 110 does not execute the (undesired, in this case) second predetermined operation and the device 110 executes the (desired, in this case) first predetermined operation.

Further, there also may cause a case where, even if the operator intends that the second predetermined operation should be executed, the operator erroneously operates the first control unit 10. In this case, the determination device 100 determines that the second predetermined operation should be executed in accordance with the intention (of this case) of the operator. This determination may be done based on the state of a directive switch (to be previously operated by the operator in accordance with the operator's intention) or other appropriate means.

By this determination result, the determination device operates the first switching device 13 so that the first control device 12 is disconnected from the first operation device 11 and the second control device 22 is connected with the first operation device 11. Thus, the first operation signal provided from the first operation device 21 is provided only to the second control device 22. Thus, the first control device 12 does not provide the first control signal, and the second control device 22 provides the second control signal to the execution device 110. Thus, the execution device 110 does not execute the (undesired, in this case) first predetermined operation and the device 110 executes the (desired, in this case) second predetermined operation.

As mentioned above, the undesired operation executed by the execution device 110 caused by the misoperation by the operator can be prevented by means of the above-mentioned function executed by the determination device 100. Thus, it is always possible that a the desired operation is executed by the execution device 110.

Figure 6:
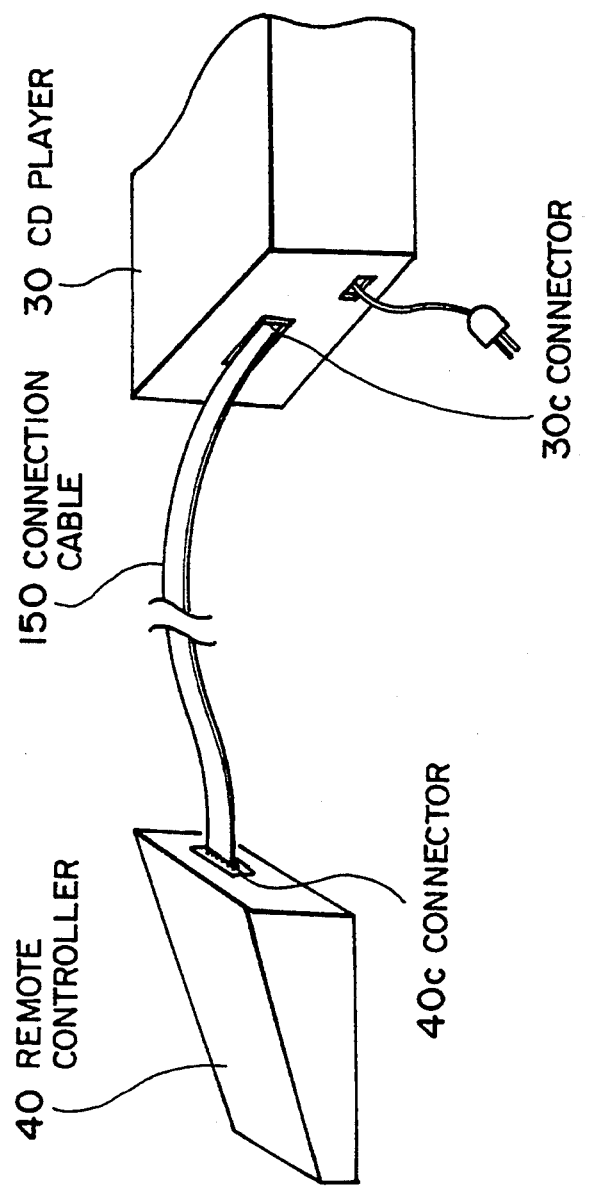
FIG. 6 shows outline views of a remote controller and a CD player of the second embodiment of the control system according to the present invention shown in FIG. 3.

A remote controller 40 and a CD player 30 of a second embodiment of the control system according to the present invention is described below with reference to FIG. 3. This CD player 30 comprises an execution device 33 comprising a disc driving device 31 and a signal reproducing device 32 both having the well-known configurations. The player 30 further comprises a control device 34, comprising a microcomputer and providing a control signal to the execution device so as to control it. The player 30 further comprises an operation device 35 having keys which the operator directly operates (pushes). The remote controller 40 and the CD player 30 are connected to each other, as shown in FIG. 6, through a connection cable 150 and connecters 40c and 30c.

An interface board, used for input and/or output of command between the remote controller 40 (to be physically connected to this interface board included in the CD player 30), through the above-mentioned connecters 40c, and the CD player 30, is connected to an I/O (input/output) port of the microcomputer of the control device 34, in the CD player 30. This interface board has a terminal "A", the voltage appears on which terminal reflecting whether or not the remote controller 40 is physically connected to the interface board. This interface board has a feature as described below. When the remote controller 40 is physically a logic-high voltage level appears at the terminal "A". When the remote controller 40 is not physically connected to the interface board, a logic-low voltage level appear at the terminal "A".

The control device 34 comprises a determination device 36, acting as the above-mentioned determination device 100, and being programmable in this embodiment. This determination device 36 determines a process method for processing an operation signal and a control signal both provided to the control device 34, based on the voltage level of the above-mentioned terminal "A" of the interface board, as described below.

Figure 3:
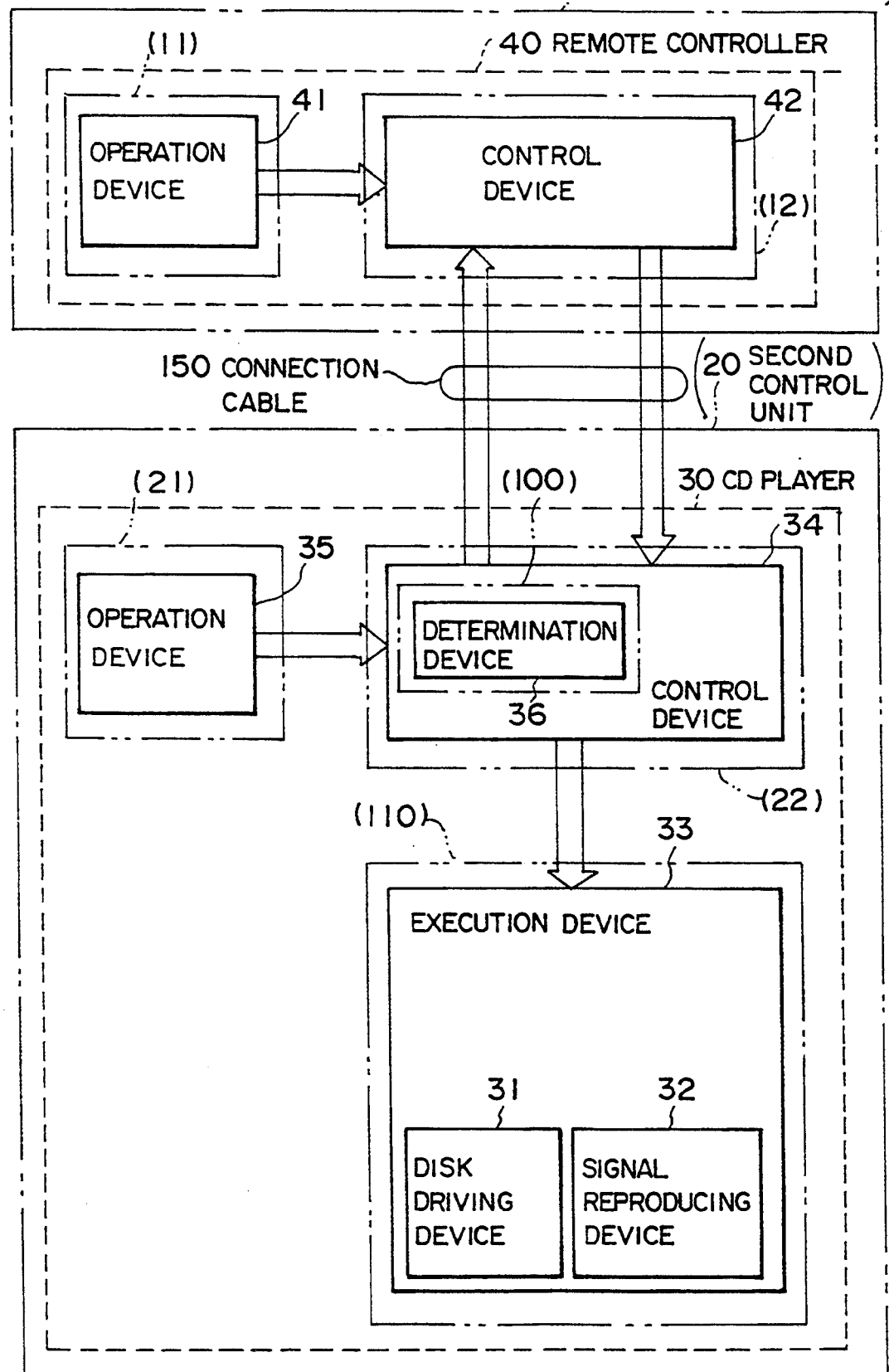
FIG. 3 shows a block diagram of a second embodiment of the control system according to the present invention.

The remote controller 40 shown in FIG. 3 comprises an operation device 41 having an approximately similar configuration to that of the operation device 35 of the CD player 30. The remote controller 40 further comprises a control device 42, to which the operation device 41 is connected and to which the operation device 41 provides an operation signal, the control device 42 comprising a microcomputer for executing a preset programmed process in response to the operation signal being given from the operation device 41.

Figure 4:
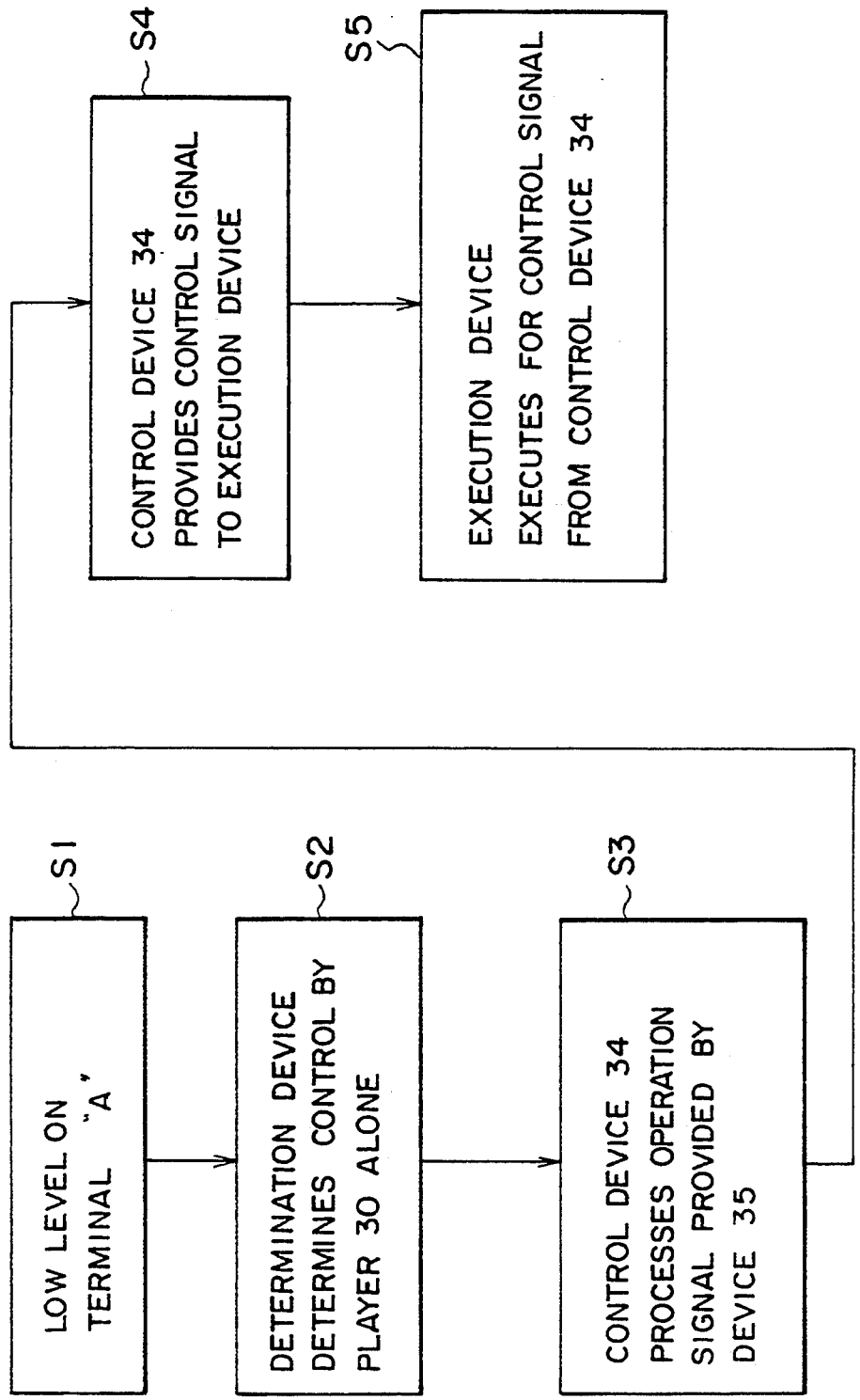
FIG. 4 shows an operation flow chart for the second embodiment of the control system according to the present invention shown in FIG. 3.
Figure 7:
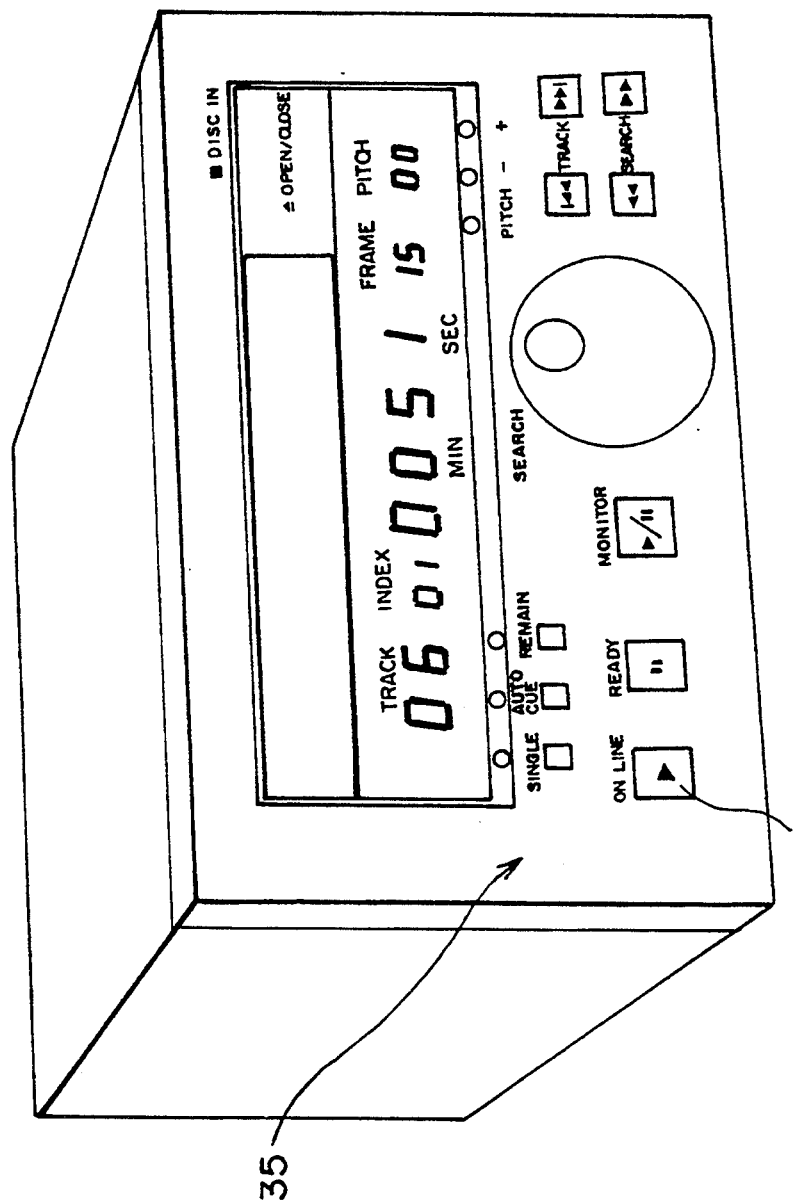
FIG. 7 shows an outline view of the CD player of the second embodiment of the control system according to the present invention shown in FIG. 3, particularly showing a front view of an operation device.

The operation flow, in the case where the remote controller 40 is not connected to the above-mentioned interface board of the above-mentioned CD player 30, is described below, with reference to FIG. 4. A low voltage level appears on the terminal "A" because the remote controller 40 is not connected to the interface board (a step S1, the expression "step" will be omitted hereinafter). The control device 34 detects this low level at the terminal "A", thus the determination device 38, acting as the above-mentioned determination device 100, determines that control of the execution device 33 should be performed by the CD player 30 alone (S2). That is, when the key (for example, a "play" key 35a shown in FIG. 7) on the operation device 35 of the CD player 30 is operated (pushed) by the operator, the control device 34 itself performs a preset process on the operation signal provided by the operation device 35 (S3), and then the control device 34 provides the control signal to the execution device 33 (S4). In the example of this operation, when the "play" key 35a on the operation device 35 is operated, the control device 34, as a result of the operation signal being provided thereto from the operation device 35, provides the control signal to the execution device 33. The execution device 33 thus executes a playback process routine resulting in a normal CD-playing operation (S5) by which, for example, the tunes recorded on the CD are played in the order in which the tunes were originally recorded.

Figure 5:
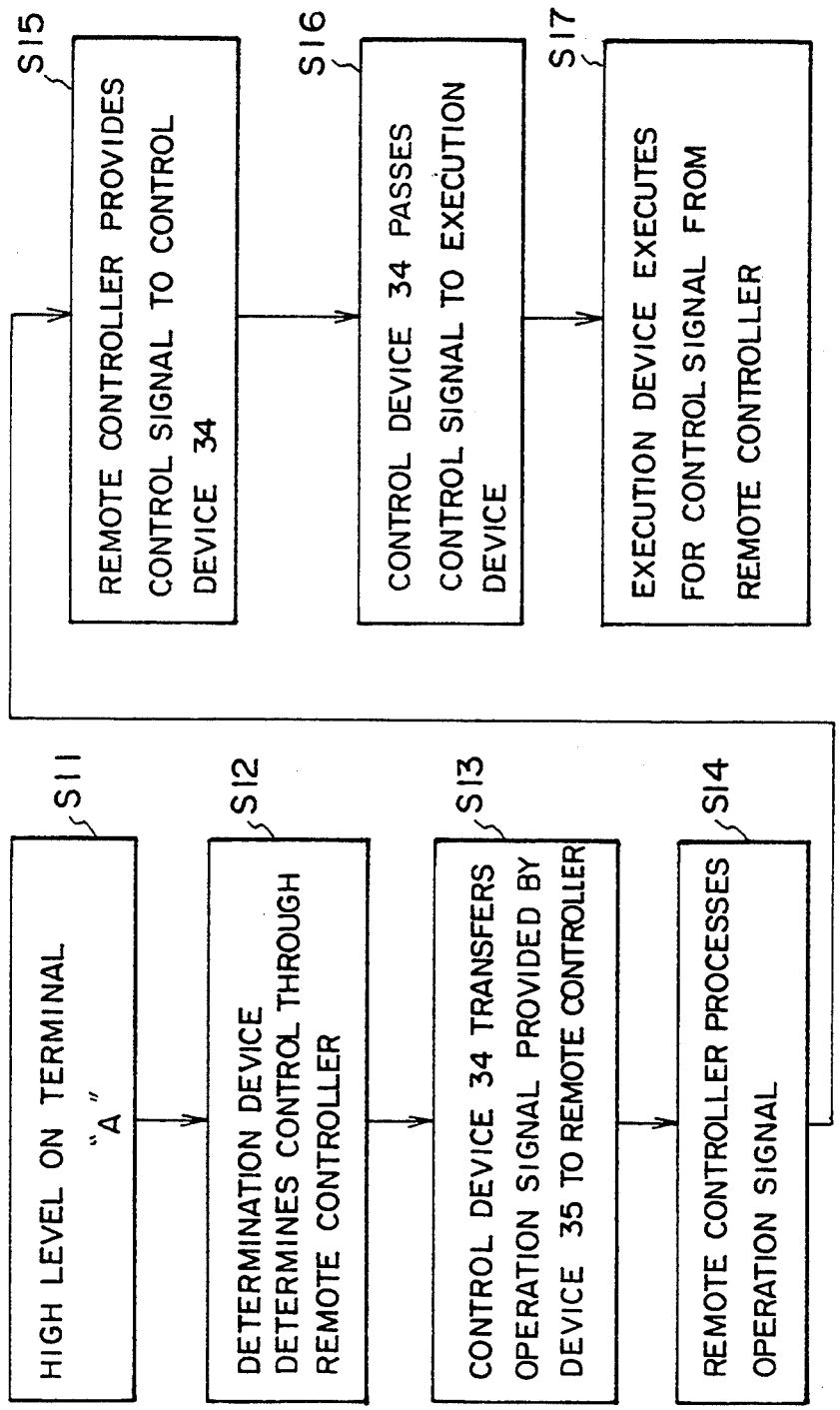
FIG. 5 shows another operation flow chart for the second embodiment of the control system according to the present invention shown in FIG. 3.

The operation flow, in the case where the remote controller 40 is connected to the above-mentioned interface board of the above-mentioned CD player 30, is described below, with reference to FIG. 5. A high level appears at the terminal "A" because the remote controller 40 is connected to the interface board (a step S11). The control device 34 detects this higher-level voltage on the terminal "A", thus the determination device 36 determines that control of the execution device 33 should be performed by the remote controller 40 (S12). That is, the control device 34 passes (transfers) the operation signal, provided from the operation device 35 of the CD player 30 as a result of an operation of the key (in the above mentioned example, the "play" key 35a) for a "certain function" (in this example, playing CD), to the control device 42 of the remote controller 40 via the above-mentioned I/O port and interface board (S13).

Figure 8:
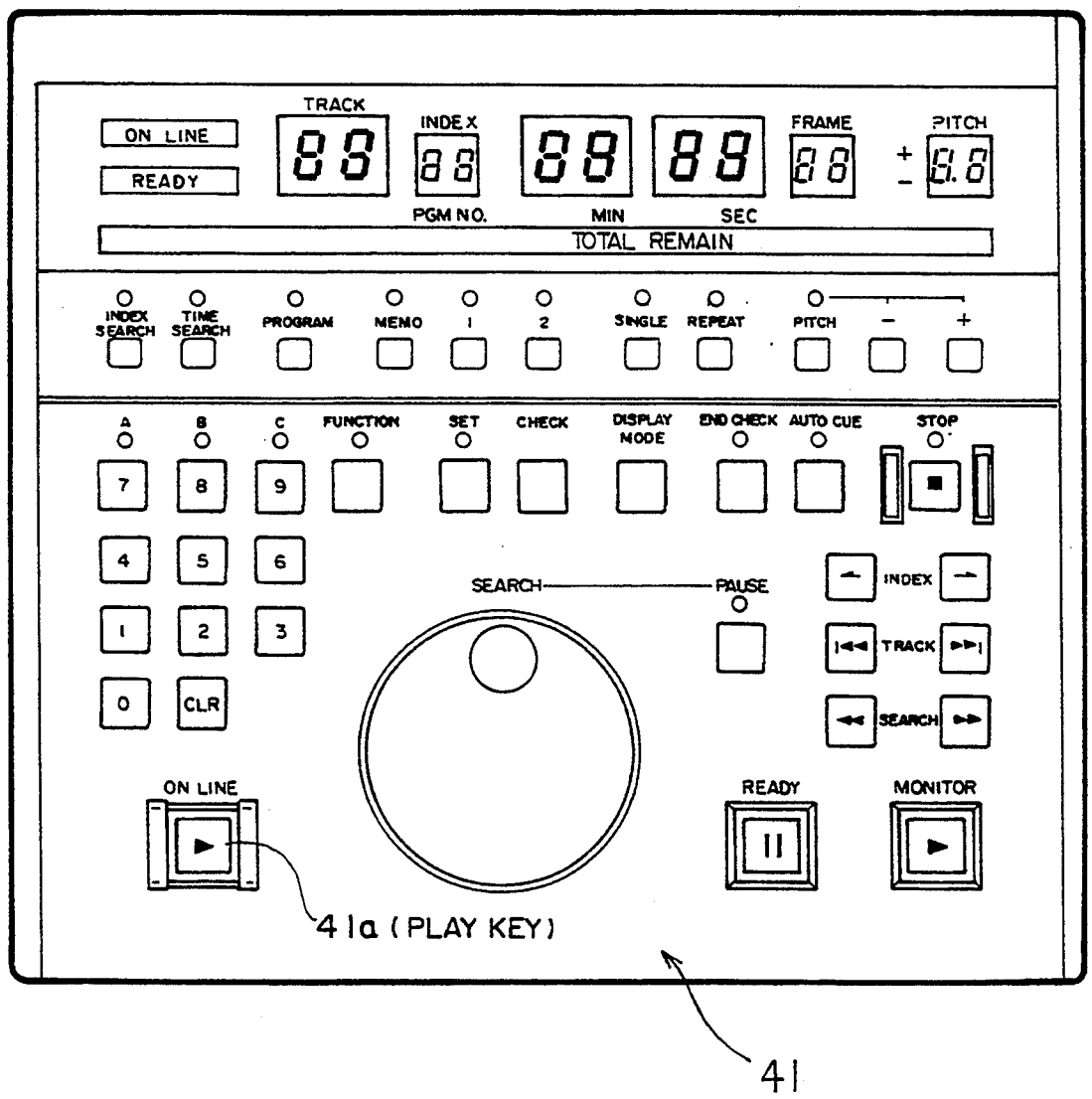
FIG. 8 shows a front view of the remote controller of the second embodiment of the control system according to the present invention shown in FIG. 3, particularly showing a front view of an operation device.
Figure 9:
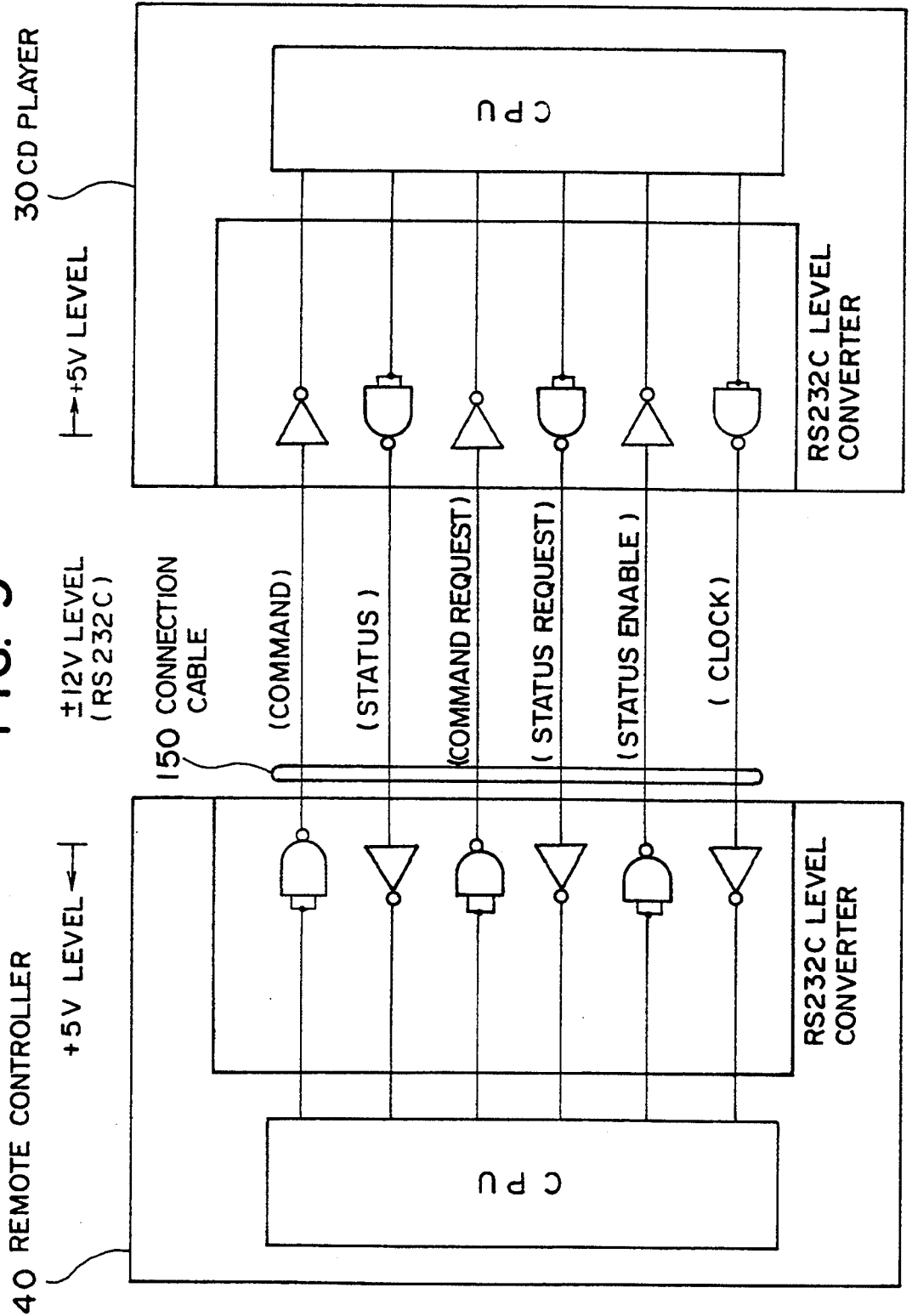
FIG. 9 shows a circuit diagram of interface parts of the CD player and the remote controller of the second embodiment of the control system according to the present invention shown in FIG. 3.

The control device 42, of the remote controller 40, after receiving the operation signal transferred from the CD player 30, recognizes this operation signal as if it had resulted from an action, by the operator, of the key (in the example, a "play" key 41a shown in FIG. 8) on the operation device 41 of the remote controller 40, the key being for the same function as the above-mentioned "certain function" (in the example, playing CD) of the key, on the operation device 35 of the CD player 30. Thus, the control device 42 carries out a preset programmed process (S14) identically the case where the above-mentioned key for the "certain function" on the operation device 41 is operated (pushed), thus providing the operation signal to the control device 84 of the CD player 30 via the above-mentioned interface board and I/O port of the CD player 30 (S15).

The control device 34 of the CD player 30, receiving the above-mentioned control signal provided, when a high level appears at the terminal "A" (in this case, the higher-level voltage appearing as shown in S11), passes the control signal to the execution device 33 (S16), in accordance with the preset program. The execution device 33 executes a predetermined operation in accordance with the control signal passed (S17).

In the above mentioned example of the above-mentioned operation flow, in the condition in which the remote controller 30 is connected to the interface board of the CD player 30, when the "play" key 35a on the operation device 35 of the CD player 30 is operated (pushed) by the operator, the operation signal provided from the operation device 35 is supplied to the control device 34. The control device 34, detecting the high level on the terminal "A" as a result of the remote controller 40 being connected to the interface board, thus passes (transfers) the operation signal (command) provided from the operation device 35 to the control device 42 of the remote controller 40 via the I/O port and interface board.

The control device 42 of the remote controller 40 behaves, as mentioned above, as if this control signal transferred from the control device 34 had resulted from the "play" key 41a on the operation device 41 of the remote controller 40 being operated by the operator. Thus, if, for example, a playing sequence program has been set in the microcomputer of the control device 42, by which program the tunes recorded on the CD are automatically reproduced in the programmed desired order (the above-mentioned playing sequence) different from that in which the tunes were originally recorded, the control device 42 provides the control signal so that the playback operation is initiated from the first tune in the order according to the programmed playing sequence.

This control signal is transferred to the control device 34, as mentioned above. The control device 34, because of the high level appearing at the terminal "A" of the interface board, thus passes this control signal to the execution device, without performing any processing, other than the above-mentioned passing, on the control signal. The execution device 33, as a result of receiving the control signal, starts a playing operation in accordance with the above-mentioned programmed playing sequence.

In summary, in the case where the remote controller 40 is connected to the interface board, the determination device 36 of the control device 33 of the CD player 30 determines the process method to be that in which the execution device 33 is controlled through the remote controller 40. Then the control device 34 merely passes (transfers) the operation signal provided from the operation device 35 to the remote controller 40, without performing any processing, other than the above-mentioned passing (transferring), on the control signal. Thus, the execution device 33 is controlled only in accordance with the control signal provided from the control device 42 of the remote controller 40. That is, the control mode of the CD player 30 is switched to a mode (automatic control mode) in which the CD player 30 is controlled so that the tunes recorded on the CD is played in accordance with the programed sequence, the playing being initiated by operating (pushing) one of the "play" keys 35a and 41a of the CD player 30 and the remote controller 40.

On the other hand, in the case where the remote controller 40 is not connected to the interface board of the CD player 30, the determination device 38 of the control device 34 of the CD player 30 determines the process method to be that in which the execution device 33 is controlled only by the CD player 30. Thus, without regard to the contents of the program in accordance with which the microcomputer of the control device 42 of the remote controller 40 executes, the execution device 33 executes in accordance with the process originating in the control device 34 itself. That is, the control mode of the CD player 30 is switched to another mode (manual control mode) in which the CD player 30 is controlled so that the tunes recorded on the CD is played in the order in which the tunes were originally recorded, the playing being initiated by operating (pushing) one of the "play" keys 35a and 41a of the CD player 30 and the remote controller 40.

Such behavior, that can be selected as desired according to whether or not the remote controller 40 is connected to the interface board of the CD player 30, enables various, flexible, application of the functions of the remote controller 40 and the CD player 30 to, for example, a case of maintenance work being performed on the CD, or a case of completely manual operation of the execution device 33. The above-mentioned maintenance or completely manual operation may be performed with the remote controller 40 being disconnected from the interface board of the CD player 30. Further, a useful function, the CD player cannot have which function originally in a certain condition and the remote controller can have which function, can be added to the function of the CD player. Furthermore, it is possible to employ the useful function by operating both operation devices of the remote controller and the CD player, without occurring either a confusion or a collision of operation signals provided from the both operation devices.

The procedure for determining the process method, i.e. whether the execution device 33 is controlled by the CD player 30 alone or controlled through the remote controller 40, is not limited to the above-mentioned procedure of the second embodiment, in which procedure the determination device 38 determines based on the condition of whether or not the remote controller 40 is connected to the interface board of the CD player 30. Further, another method may be applicable such as that in which the CD player 30 has a directive switch having positions labeled "remote controller 40 side" and "CD player 30 side". When the directive switch is in the "remote controller 40 side" position, the determination device 36 determines the execution device 33 to be controlled through the remote controller 40. That is, the control mode of the CD player 30 is switched to a mode (automatic control mode) in which the CD player 30 is controlled so that the tunes recorded on the CD is played in accordance with the programed sequence, the playing being initiated by operating one of the "play" keys 35a and 41a of the CD player 30 and the remote controller 40. On the other hand, when the directive switch is in the "CD player 30 side" position, the determination device 36 determines the execution device 33 to be controlled by the CD player 30 alone. That is, the control mode of the CD player 30 is switched to another mode (manual control mode) in which the CD player 30 is controlled so that the tunes recorded on the CD is played in the order in which the tunes were originally recorded, the playing being initiated by operating one of the "play" keys 35a and 41a of the CD player 30 and the remote controller 40.

The present invention can be applicable not only to the above-mentioned CD player but also applicable to a playback apparatus using a recording medium other than a CD, and further applicable to a recording and/or playback apparatus, a recording only apparatus, a data processing apparatus such as a computer, and other apparatus.

Further, the method, in which the above-mentioned operation signal provided from the control device 34 of the CD player 30 is transferred to the remote controller 40, is not limited to the method, in the above-mentioned second embodiment, in which method this transferring process is executed by means of a computer program (software). Another method may be applicable, in which method the transferring process is executed by means of a switching means, such as digital hardware (for example, using a logic element, such as AND/OR device). In this case, the determination device 36 controls this switching means appropriately.

As mentioned above, by the present invention, the predetermined operation executed does not depend on which operation device is operated by the operator, rather it depends on the determination made by the determination device. Thus, an undesired predetermined operation being executed by the execution device can be prevented.

Further, the present invention is not limited to the above described embodiments, and variations and modifications may be made without departing from the scope of the present invention.

What is claimed is:

1. A control system comprising:
    execution means for executing a predetermined action either in a first predetermined manner or in a second predetermined manner;
    a first control unit comprising:
        first operation means for an operator for performing an operation thereon, said performed operation causing said first operation means to provide a corresponding operation signal; and
        first control means for, in response to the operation signal being provided by said first operation means, providing a corresponding control signal;
    a second control unit comprising:
        second operation means for an operator for performing an operation thereon, said performed operation causing said second operation means to provide a corresponding operation signal; and
        second control means for either sending the operation signal provided by said second operation means to said first control unit or providing a control signal for controlling said execution means so as to make said execution means execute said predetermined action either in said first predetermined manner if said second control means receives the control signal provided by said first control means or in said second predetermined manner if said second control means receives the operation signal provided by said second operation means; and
    determination means for determining which process of a first process and a second process is to be executed, said second control means providing the control signal corresponding to the operation signal provided by said second operation means to said execution means in said first process and the operation signal provided by said second operation means being further sent to said first control means in said second process; and
    wherein:
        said first control means provides the corresponding control signal to said second control means if said first control means receives the operation signal provided by said first operation means; and also
        said first control means provides the corresponding control signal to said second control means if the first control means receives, via said second control means, the operation signal provided by said second operation means.

2. The control system according to claim 1, wherein:
    said predetermined action comprises reproducing data previously recorded on a recording medium;
    said predetermined action in said first predetermined manner comprises reproducing said data in the order in which said data were originally recorded; and
    said predetermined action in said second predetermined manner comprises reproducing said data in a predetermined order different from said order in which said data were originally recorded.

3. The control system according to claim 1, wherein:
    said first control unit comprises said executing means; and
    said second control unit is located remotely from said first control unit.

4. The control system according to claim 1, wherein said predetermined action comprises at least one of recording data on a recording medium and reproducing data previously recorded on a recording medium.

5. The control system according to claim 1, wherein said second control unit comprises said second operation means, said second control means and said determination means.

6. The control system according to claim 1, wherein said determination means determines which process of said first and second processes should be executed, based on the state of a physical connection between said first control unit and said second control unit.

7. The control system according to claim 1, wherein said determination means determines which process of said first and second processes should be executed, based on the state of a directive switch.

8. The control system according to claim 1, wherein each of said first and second operation means has a key for pushing thereof, and each of said first and second operation means provides the operation signal in response to said key being pushed.

9. A control system comprising:
    an execution apparatus for executing a predetermined action thereby in a manual control mode wherein said predetermined action is executed in a predetermined manner;

a remote controller for controlling said execution apparatus remotely so that said execution apparatus executes said predetermined action in an automatic control mode wherein said predetermined action is executed according to an arbitrary program which has been previously created by an operator;

connecting means for connecting between said execution apparatus and said remote controller; and switching means for switching a control mode of said execution apparatus to said manual control mode if said connecting means does not connect between said execution apparatus and said remote controller, said switching means switching the control mode of said execution apparatus to said automatic control mode if said connecting means connects between said execution apparatus and said remote controller.

10. The control system according to claim 9, wherein:

said execution apparatus comprises a player for a CD;

both said execution apparatus and said remote controller respectively comprise play keys;

a CD is played manually so that tunes recorded on said CD are played in the order in which said tunes were recorded originally, the playing being initiated by pushing one of said play keys of said CD player and said remote controller, in said manual control mode; and a CD is played automatically so that said tunes recorded on said CD are played in another order in accordance with said arbitrary program, the automatic playing being initiated by pushing one of said play keys of said CD player and said remote controller, in said automatic control mode.

11. A control system comprising:

execution means for executing a predetermined action either in a first predetermined manner or in a second predetermined manner;

a first control unit comprising:

first operation means for an operator for performing an operation thereon, said performed operation causing said first operation means to provide a corresponding operation signal; and first control means for, in response to receipt of an operation signal, providing a corresponding control signal for controlling said execution means so as to make said execution means execute said predetermined action in said first predetermined manner;

a second control unit comprising:

second operation means for an operator for performing an operation thereon, said performed operation causing said second operation means to provide a corresponding operation signal; and second control means for, in response to receipt of an operation signal, providing a corresponding control signal for controlling said execution means so as to make said execution means execute said predetermined action in said second predetermined manner;

first switching means for switching the destination to which the operation signal provided by said first operation means is to be sent, said destination being either said first control means or said second control means; and second switching means for switching the destination to which the operation signal provided by said second operation means is to be sent, said destination being either said second control means or said first control means; and wherein:

said first control means provides the control signal for controlling said execution means so as to make said execution means execute said predetermined action in said first predetermined manner in either the case of receipt of the operation signal provided by said first operation means or the case of receipt of the operation signal provided by said second operation means; and said second control means provides the control signal for controlling said execution means so as to make said execution means execute said predetermined action in said second predetermined manner in either the case of receipt of the operation signal provided by said first operation means or the case of receipt of the operation signal provided by said second operation means.

* * * * *